US012730702B2

(12) United States Patent
Chen et al.

(10) Patent No.: US 12,730,702 B2
(45) Date of Patent: Sep. 8, 2026

(54) EARLY ROOT CAUSE LOCALIZATION

(71) Applicant: NEC Laboratories America, Inc., Princeton, NJ (US)

(72) Inventors: Zhengzhang Chen, Princeton Junction, NJ (US); Haifeng Chen, West Windsor, NJ (US); Yanchi Liu, Princeton, NJ (US); LuAn Tang, Cranbury, NJ (US); Haoyu Wang, Plainsboro, NJ (US); Dongjie Wang, Orlando, FL (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/977,175

(22) Filed: Dec. 11, 2024

(65) Prior Publication Data

US 2025/0199900 A1 Jun. 19, 2025

Related U.S. Application Data

(60) Provisional application No. 63/609,628, filed on Dec. 13, 2023.

(51) Int. Cl.
*G06F 11/07* (2006.01)
*G06F 21/55* (2013.01)

(52) U.S. Cl.
CPC ........ *G06F 11/079* (2013.01); *G06F 11/0709* (2013.01); *G06F 21/55* (2013.01)

(58) Field of Classification Search
CPC ............. G06F 11/0709; G06F 11/0712; G06F 11/079; G06F 11/3048; G06F 21/55–556; H04L 63/14; H04L 63/1408; H04L 63/1416; H04L 63/1425; H04L 63/1441–1491
See application file for complete search history.

(56) References Cited

U.S. PATENT DOCUMENTS

2019/0044969 A1* 2/2019 Pilkington .......... H04L 63/1433
2019/0266253 A1* 8/2019 Maiti .................... G06F 16/243
2020/0250308 A1* 8/2020 Li ........................... G06F 21/56
2021/0111943 A1* 4/2021 Moser ................... H04L 41/142
2022/0358005 A1* 11/2022 Saha ..................... G06F 40/216
2022/0382614 A1 12/2022 Chen et al.
2023/0069074 A1 3/2023 Chen et al.
2024/0054043 A1 2/2024 Chen et al.
2024/0061739 A1 2/2024 Chen et al.
2024/0061740 A1 2/2024 Chen et al.
(Continued)

OTHER PUBLICATIONS

Meng et al., “Localizing Failure Root Causes in a Microservice through Causality Inference”, 2020, IEEE, pp. 1-10. (Year: 2020).*
(Continued)

*Primary Examiner* — Gabriel Chu
(74) *Attorney, Agent, or Firm* — Vincent Duffy

(57) ABSTRACT

Methods and systems for root cause analysis include combining system logs and system metrics into time-series data. Individual root cause analysis is performed to determine individual causal scores for respective system entities. Topological root cause analysis is performed to capture topological patterns of system anomalies. The individual causal scores and the topological patterns are integrated by a weighted sum. A corrective action is performed on an entity identified based on the weighted sum.

20 Claims, 4 Drawing Sheets

(56) References Cited

U.S. PATENT DOCUMENTS

2024/0202063 A1 * 6/2024 Kim .................... G06F 11/0709

OTHER PUBLICATIONS

Zheng, L., Chen, Z., He, J., & Chen, H. (May 2024). MULAN: Multi-modal Causal Structure Learning and Root Cause Analysis for Microservice Systems. In Proceedings of the ACM on Web Conference 2024 (pp. 4107-4116).
Zheng, L., Chen, Z., He, J., & Chen, H. (Feb. 4, 2024). Multi-modal Causal Structure Learning and Root Cause Analysis. arXiv preprint arXiv:2402.02357.
Zheng, L., Chen, Z., Wang, D., Deng, C., Matsuoka, R., & Chen, H. (Sep. 26, 2024). LEMMA-RCA: A Large Multi-modal Multi-domain Dataset for Root Cause Analysis. arXiv preprint arXiv:2406.05375.
Deng, C., Chen, Z., Zhao, X., Wang, H., Wang, J., Chen, H., & Gao, J. (Oct. 28, 2024). RIO-CPD: A Riemannian Geometric Method for Correlation-aware Online Change Point Detection. arXiv preprint arXiv:2407.09698.
Wang, D., Chen, Z., Fu, Y., Liu, Y., & Chen, H. (Aug. 6, 2023). Incremental causal graph learning for online root cause analysis. In Proceedings of the 29th ACM SIGKDD Conference on Knowledge Discovery and Data Mining (pp. 2269-2278).
Wang, D., Chen, Z., Ni, J., Tong, L., Wang, Z., Fu, Y., & Chen, H. (Aug. 6, 2023). Interdependent causal networks for root cause localization. In Proceedings of the 29th ACM SIGKDD Conference on Knowledge Discovery and Data Mining (pp. 5051-5060).

* cited by examiner

EARLY ROOT CAUSE LOCALIZATION

RELATED APPLICATION INFORMATION

This application claims priority to U.S. Patent Application No. 63/609,628, filed on Dec. 13, 2023, incorporated herein by reference in its entirety.

BACKGROUND

Technical Field

The present invention relates to system management and, more particularly, to root cause analysis.

Description of the Related Art

A cyber-physical system may include a variety of sensors, which may collect a wide variety of information about the system, its operation, and its environment. The collected data may be used to characterize the operational characteristics of the cyber-physical system, for example to determine when the cyber-physical system may be operating outside its expected normal parameters.

SUMMARY

A method for root cause analysis includes combining system logs and system metrics into time-series data. Individual root cause analysis is performed to determine individual causal scores for respective system entities. Topological root cause analysis is performed to capture topological patterns of system anomalies. The individual causal scores and the topological patterns are integrated by a weighted sum. A corrective action is performed on an entity identified based on the weighted sum.

A system for root cause analysis includes a hardware processor and a memory that stores a computer program. When executed by the hardware processor, the computer program causes the hardware processor to combine system logs and system metrics into time-series data, to perform individual root cause analysis to determine individual causal scores for respective system entities, to perform topological root cause analysis to capture topological patterns of system anomalies, to integrate the individual causal scores and the topological patterns by a weighted sum, and to perform a corrective action on an entity identified based on the weighted sum.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Root cause analysis helps to identify the origins of failures and anomalies within cyber-physical systems, particularly in microservice systems. A fault within any microservice can negatively impact user experience. To ensure the reliability and robustness of microservice systems, key performance indicators (KPIs) such as latency, metrics data such as processor and memory usage, and log data such as pod-level container orchestration entries may be analyzed. However, the complexity of these systems, combined with the vast amount of monitoring data can make manual root cause analysis both costly and error-prone.

Performing root cause analysis with a single modality can fail to capture the intricacies of abnormal patterns associated with system failures, which can produce suboptimal solutions. For example, some system failures, such as database query failures and logic failures, may easily escape detection if system logs are not used to pinpoint their root causes. At the same time, system metrics and logs collectively contribute to the localization of system faults like running out of disk space. Root cause analysis that makes use of multimodal data provides a deeper and more thorough insight into system failures. Early root cause localization enables reporting early results within a tolerance time after a system failure is reported. This helps to diagnose failures and faults in, e.g., cloud/microservice systems.

Figure 1:
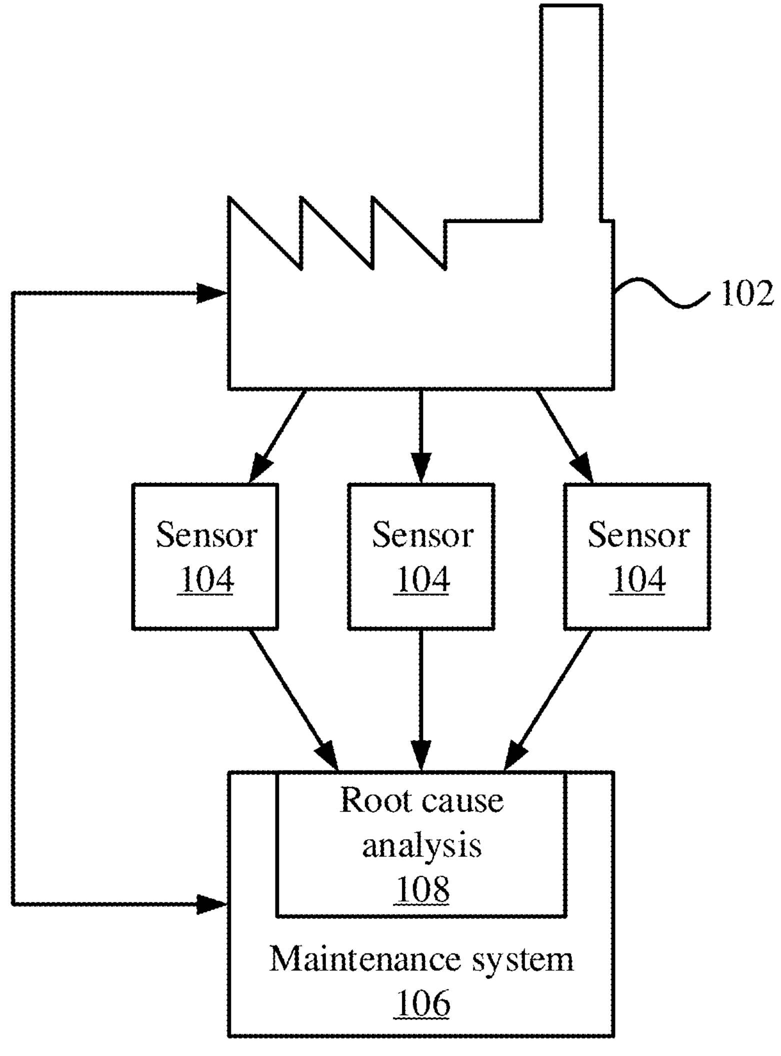
FIG. 1 is a diagram illustrating the use of root cause analysis by a maintenance system to direct corrective actions, in accordance with an embodiment of the present invention.

Referring now in detail to the figures in which like numerals represent the same or similar elements and initially to FIG. 1, a maintenance system 106 in the context of a monitored system 102 is shown. The monitored system 102 can be any appropriate system, including physical systems such as manufacturing lines and physical plant operations, electronic systems such as computers or other computerized devices, software systems such as operating systems and applications, and cyber-physical systems that combine physical systems with electronic systems and/or software systems. Exemplary systems 102 may include a wide range of different types, including railroad systems, power plants, vehicle sensors, data centers, satellites, and transportation systems. Another type of cyber-physical system can be a network of internet of things (IoT) devices, which may include a wide variety of different types of devices, with various respective functions and sensor types.

One or more sensors 104 record information about the state of the monitored 416 system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The sensor data may include, e.g., numerical data and categorical or binary-valued data. The information generated by the sensors 104 can be in any appropriate format and can include sensor log information generated with heterogeneous formats.

The sensors 104 may transmit the logged sensor information to an anomaly maintenance system 106 by any appropriate communications medium and protocol, including wireless and wired communications. The maintenance system 106 can, for example, identify abnormal or anomalous behavior by monitoring the multivariate time series that are generated by the sensors 104. Once anomalous behavior has been detected, the maintenance system 106 communicates with a system control unit to alter one or more parameters of the monitored system 102 to correct the anomalous behavior.

Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The maintenance system 106 thereby automatically corrects or mitigates the anomalous behavior. By identifying the particular sensors 104 that are associated with the anomalous classification, the amount of time needed to isolate a problem can be decreased.

Each of the sensors 104 outputs a respective time series, which encodes measurements made by the sensor over time. For example, the time series may include pairs of information, with each pair including a measurement and a timestamp, representing the time at which the measurement was made. Each time series may be divided into segments, which represent measurements made by the sensor over a particular time range. Time series segments may represent any appropriate interval, such as one second, one minute, one hour, or one day. Time series segments may represent a set number of collection time points, rather than a fixed period of time, for example covering 100 measurements.

Sensors 104 may collect information about conditions of the system 106, such as information that relates to system control and operation mode. Sensors 104 may also collect information relating to key performance indicators (KPIs) such as temperature, humidity, motion, and pressure to characterize the system health and key parameters.

The maintenance system 106 includes root cause analysis 108, which helps to identify a source of a detected anomaly. The root cause analysis 108 may indicate, for example, one or more sensors 104 that are most strongly associated with the anomalous state, so that the maintenance system 106 can accurately direct its responsive action. For example, if the root cause analysis 108 indicates that a particular temperature sensor is the cause of the anomaly, the maintenance system 106 may issue an instruction to increase cooling in the local environment or may shut down an associated device to prevent further damage. If the root cause analysis 108 indicates that an anomaly derives from anomalous user activity on a particular server, for example based on system logs, then the maintenance system 106 may act to change a security level, to disable the user's access, or to disconnect the server from a computer network.

Root cause analysis 108 in a cloud system may make use of a monitoring agent that collects KPIs, metrics data, and system logs. The system logs may be transformed into time series data to be integrated with the monitoring metrics. Correlation-based Riemannian manifold learning may be used to detect changes in the system's status by analyzing log Euclidean distances between consecutive time windows. Real-time causal analysis may be performed on each metric and disentangled causal graph learning may be used for rapid causal model updates. Individual and topological results may be combined using a weighted sum to identify final root causes, which provides timely results before reaching a maximum latency time. This approach balances analytical depth with timeliness.

Figure 2:
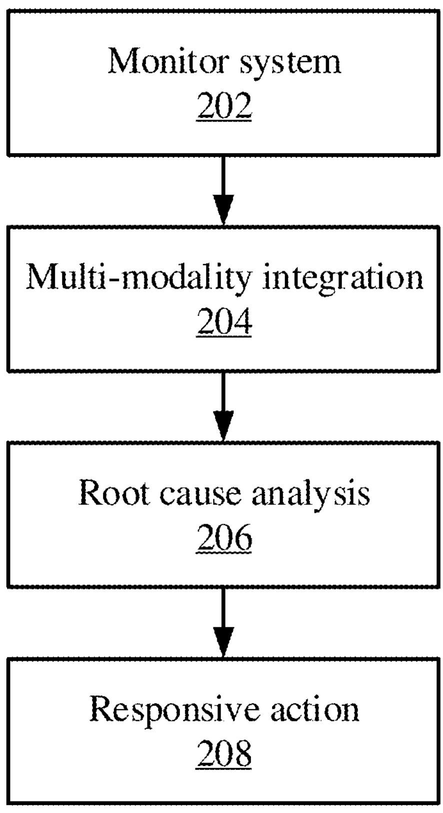
FIG. 2 is a block/flow diagram of a method for identifying and responding to the root cause of an incident, in accordance with an embodiment of the present invention.

Referring now to FIG. 2, a method for detecting and correcting system anomalies is shown. Block 202 monitors a system, for example using sensors 104. The sensors 104 may monitor physical properties of the system and may furthermore collect system logs that represent activities of the system. In a cloud system, the monitored data may thus include report data from the whole system and metrics data of running containers/nodes and the applications/pods, as well as system logs of operating system events that indicate how the system processes and drivers are loaded. Latency may be used as a KPI of an entire microservice system, measuring the latency from just before sending a request to just after the first chunk of a response is received. Latency provides time-series data that indicates the system status and directly reflects the quality of service. For example, a system failure may result in increased latency or connection times.

Metrics data, meanwhile, may include a number of metrics that indicate the status of a microservice's underlying component/entity. The underlying component/entity can be a microservice's underlying physical machine, container, virtual machine, or pod. The corresponding metrics may include, for example, processor utilization or saturation, memory utilization or saturation, or disk input/output utilization. These metrics may be represented as time-series data. Anomalous metrics can be the potential root cause of an increased latency time that indicates a microservice failure.

The system logs include records of operating system events and may be unstructured. The system logs may be parsed to ger structured log templates, which may then be transformed into time-series data. The time-series data may include, e.g., frequency time-series and golden-signals time-series for each system entity.

Frequency time-series data may be generated by extracting details, such as entities and their corresponding timestamps, from the parsed log data. Time windows may then be defined, with data in each window being aggregated for the entity by counting its occurrences. The frequency within each time window may thereby be tallied.

Golden-signal time-series data may be generated using domain knowledge. For example, system failures can be classified into various types, including denial of service attacks, storage failures, high processor utilization, high memory utilization, etc. Each type of system failure or anomaly may be associated with specific keywords, also referred to herein as golden signals. By identifying these keywords within the log event templates, a particular template can be identified as indicating an abnormal status. Exemplary golden signal keywords include, e.g., "error," "exception," "critical," "fatal," "timeout," "connection," "no space left on device," "out of memory," "terminated unexpectedly," "backtrace," "stack trace," "service unavailable," "502 bad gateway," "503 service unavailable," "504 gateway timeout," "unable to connect," "rate limit exceeded," "request limit exceeded," "cloud system down," "cloud system not responding," "failure," "corrupted data," "data loss," "file not found," "high CPU utilization," "CPU spike," "CPU saturation," "excessive CPU usage," "failed," "shutdown," "permission denied," "DEBUG," and more. Time windows may be defined to determine analysis granularity, and the number of occurrences of each golden signal may be determined for each system entity within each window. Parsed log data may be grouped by timestamp, system entity, and signal, tallying the frequency within each time window.

Block 204 performs multi-modality integration to combine system logs and system metrics. These types of data come originally in different formats. Block 204 performs online log parsing to extract the information they contain. This process includes counting the frequency of log templates and other information to convert the logs into time-series data. The time-series data from the system logs can then be integrated with other metrics data which originates as time-series information. The result is a multi-modality system data set.

Based on the recorded system information, block 206 performs the root cause analysis, identifying one or more sensors 104 that are related to a detected anomaly. The root cause analysis 206 may include anomaly detection with a multivariate time-series analysis based on the integrated, multi-modality system data, that indicates when the system has entered an unusual or anomalous state. The root cause analysis 206 may output a ranked list of potential causes. Using the causes identified by the root cause analysis 206, block 208 performs a responsive action to correct the anomalous state.

The responsive action 208 may include changing the operational or environmental state of one or more parts of the system 102. For example, the maintenance system 106 may issue a command to start or stop some hardware or software component of the system 102 or to change an environmental parameter such as temperature or humidity. In some cases the responsive action 208 may change the configuration of a hardware or software component. For example, if the root cause is identified as an intrusion in a networked system, the responsive action 208 may include changing a security level of the system, deactivating one or more user accounts, stopping a compromised process, and/or disconnecting the networked system from a computer network. If the root cause is identified as an overheated component, the responsive action 208 may include activating cooling systems to reduce the temperature.

Figure 3:
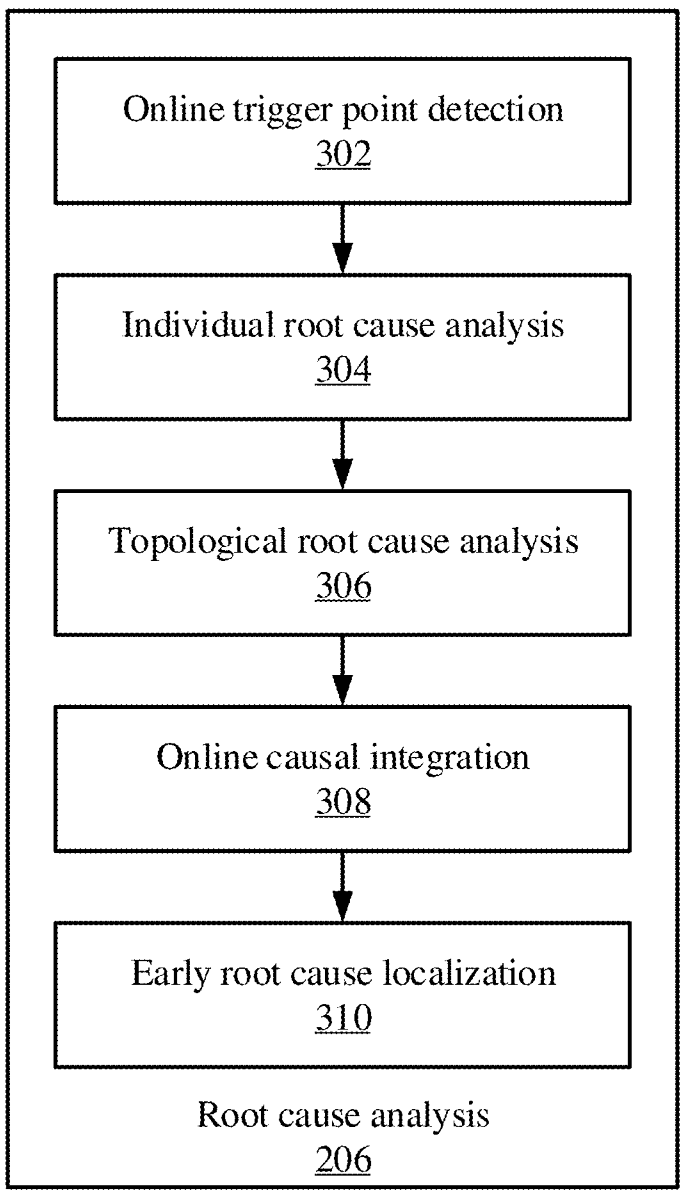
FIG. 3 is a block/flow diagram of a method for root cause analysis, in accordance with an embodiment of the present invention.

Referring now to FIG. 3, additional detail on the root cause analysis 206 is shown. Block 302 performs online trigger point detection that detects changes in system status to trigger the root cause analysis. For example, the trigger point detection 302 may perform anomaly detection that identifies an abnormal system state.

The online trigger point detection 302 may analyze and compare two consecutive batches of time-series data. A covariance matrix may be determined for each batch and then distance metrics can be used to determine the distance between the covariance matrices. A cumulative sum may be applied to the resulting array of distance to detect the change point in the system's status.

Given an input batch that collects a time span of B steps, its matrix form is expressed herein as $X=\mathbb{R}^{M\times B}$, where M denotes a number of features. The covariance matrix can then be obtained by calculating $C=X^TX$. Using the fact that covariance matrices are positive semi-definite, and the fact that positive semi-definite matrix space lies on a certain Riemannian manifold, the difference of correlation between batches of data can be formulated as the distance between two points on such a manifold.

This makes it possible to use manifold metrics to capture the correlation shift. For example, the log-Euclidean distance and the log-Cholesky distance may be used independently. Using the manifold metric, the distance between two covariance matrices $C_1$ and $C_2$ may be determined. Using the log-Euclidean metric as an example, the distance may be expressed as:

$$\text{distance}_E(C_1, C_2) = \log(\text{Euclidean}(C_1, C_2)) = \|\log(C_1) - \log(C_2)\|$$

A distance between the batches at $t_i$ and $t_{i+1}$ can thus be expressed as di, which captures the correlation shift.

Cumulative sum statistics can characterize a sequence along with time capturing the maximum of current value summing with the previous time step. At a high level, a cumulative sum hypothesis test asserts a change point at time t if the cumulative sum statistics are larger than a threshold, which may be inferred from the data. Otherwise the test is passed.

Given an observation X(t), a detection score D(t) is determined, with the cumulative sum of observations X(1), . . . , X(t) being defined as $$y(t) = \max \sum_{j=i}^{t} D(j).$$

An initial value may be set y(0)=0. Then y(t)=max{y(t−1)+distance(t)} using an appropriate distance metric.

Using the cumulative sum, a threshold h>0 may be estimated to determine an indicator function that shows when the cumulative sum is larger than a threshold:

$$H(t) = H_{1(y(t)>h)}$$

The detection score D(t) should have a negative expectation when no change is present, and a positive expectation when a change in the system state occurs.

Block 304 then performs individual root cause analysis to calculate an individual causal score for each of a set of system entities, for example based on an extreme value approach. The individual root cause analysis 304 may store historical metric data. As new data batches arrive, these are integrated with the stored historical data to create a concatenated dataset. The extreme value theory approach ensures a dynamic and continuous evaluation of causal relationships within the system, enabling prompt and accurate identification of causal factors as new data is received.

The entity metrics of root causes themselves may fluctuate more significantly than other system entities during the incidence of some system faults. For short-lived failure cases, such as a fail-stop failure, there may be no propagation patterns. As a result, temporal patterns may be analyzed individually in block 304 to provide specific causal guidance for locating root causes. Compared with the values of entity metrics during normal operation, fluctuating values may be extreme and infrequent. The extreme values may follow an extreme value distribution:

$$U_\zeta(x) = e^{\left(-(1+\zeta x)^{-\frac{1}{\zeta}}\right)}$$

where $\zeta\in\mathbb{R}$ and $1+\zeta x>0$. The term x represents the original value and $\zeta$ is an extreme value index that depends on the distribution of x. With the probability of potential extreme values in x being represented as q, the boundary ρ of normal values can be calculated using:

$$P(X > \rho) = q$$

Based on $U_\zeta$. Because the distribution of x is unknown, ζ may be estimated using the Pickands-Balkema-da Haan approach.

Block 306 performs a topological root cause analysis that uses disentangled causal graph learning to capture the topological patterns of system anomalies. Disentangled learning aims to separate invariant and variant causal relationships among various entities within a system. By distinguishing these relationships, a casual graph can be rapidly constructed for each new batch of data. This graph is then used to pinpoint root causes of issues within the system. This ensures that causal analysis remains up to date and relevant with the introduction of new data.

Topological root cause analysis 306 aims to identify the origins of system failures by analyzing how malfunctions propagate through interdependent networks. These systems may include numerous entities, each potentially influencing others within or across networks. This interconnectedness often obscures the true root causes of failures. To tackle this, a hierarchical graph neural network (GNN)-based approach may be used to uncover causal structures between low-level and high-level system entities. By learning these interdependent causal graphs, the method models failure propagation to guide root cause localization.

Directed acyclic causal graphs may be used to capture the relationships among system entities. The model uses a vector autoregressive (VAR) framework, extended through GNNs, to handle multivariate time series data. It estimates adjacency matrices representing causal connections while enforcing acyclic constraints to ensure meaningful causation without feedback loops. Intra-level causal relationships within similar levels (e.g., low-level nodes) are learned alongside inter-level relationships that map the influence of low-level entities on high-level ones. This hierarchical structure supports a comprehensive understanding of how failures propagate across system levels.

Interdependent causal graphs are further enhanced through network propagation techniques. By transposing the learned causal structure and applying a reverse analysis, a random walk with restart identifies the nodes most likely to be root causes. The method simulates the propagation of failure effects from the system's high-level indicators, such as key performance metrics, back to the potential source entities. The resulting topological causal scores rank the likelihood of nodes being root causes, providing a data-driven basis for root cause localization.

This approach integrates robust learning techniques, including sparsity regularization and nonlinear dynamics modeling, to ensure the causal graphs are both accurate and interpretable. By combining hierarchical causal discovery with propagation analysis, topological root cause analysis delivers an efficient, scalable, and explainable solution for diagnosing complex system failures.

The outputs of blocks 304 and 306 are integrated at block 308 to identify the top-K system entities as the most probable root causes. A weighted sum of the individual scores and the topological scores is used to calculate a final score for each system entity, with a weight parameter a being assigned to the individual score and with a weight parameter (1−α) being assigned to the topological score. Each system metric may be assigned a unique weight based on the deviation of that specific metric. Using these weights, an integrated score is calculated for each entity within each metric category. The integrated scores are combined across the different metrics to arrive at a final score for each system entity.

Block 310 performs early root cause localization, to improve the response speed of correcting the anomaly. The completion of root cause analysis may need stability of the learned causal graph or the output root cause list. To provide an early diagnosis, a tolerance time can be used to ensure that the index time of a current data batch is timely. If the time index exceeds the tolerance time, the causal model may be incrementally updated for more precise root cause localization. This can provide earlier insights while still maintaining the integrity and accuracy of the causal analysis.

Figure 4:
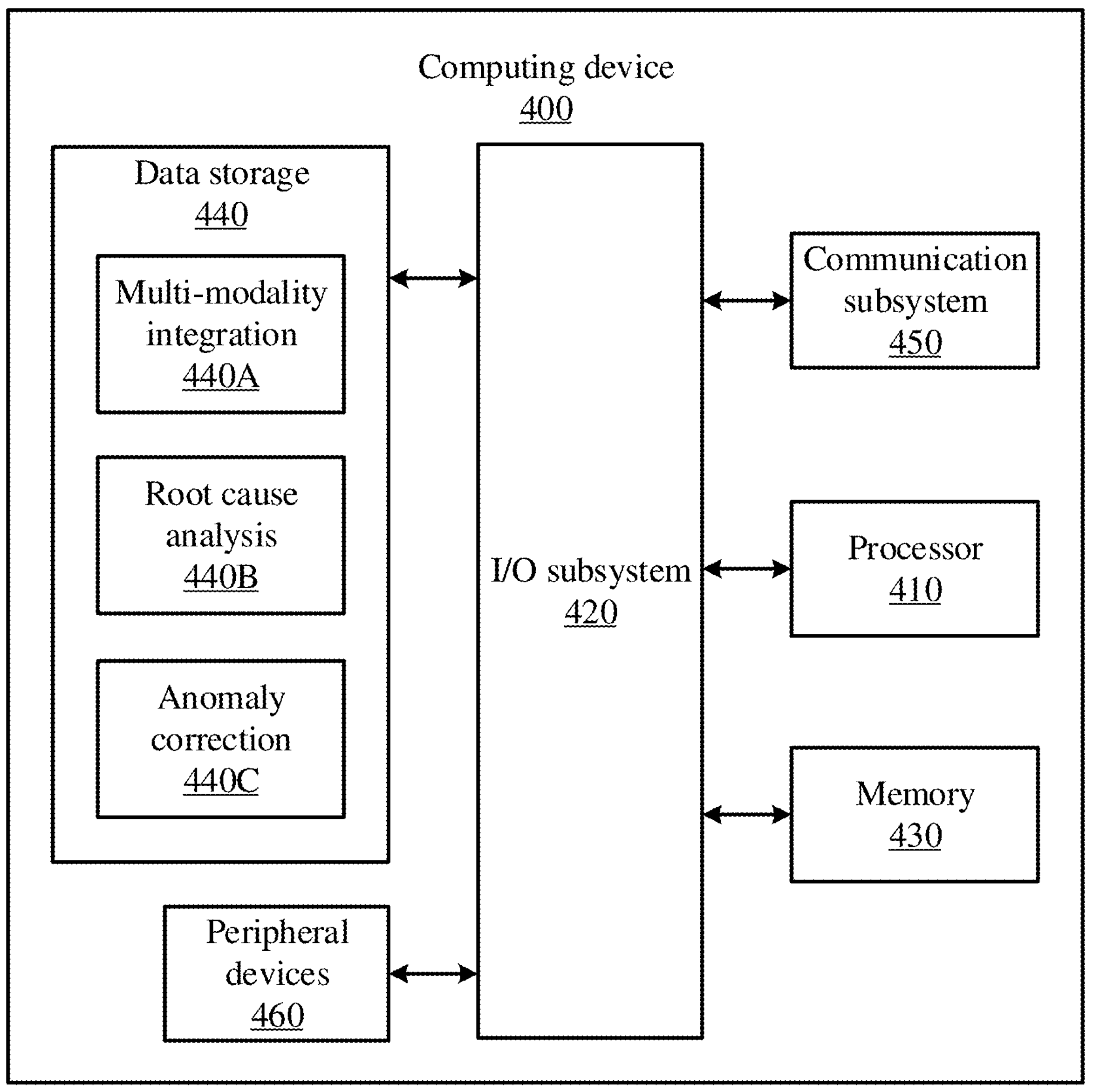
FIG. 4 is a block diagram of a computing device that can perform root cause analysis, in accordance with an embodiment of the present invention.

Referring now to FIG. 4, an exemplary computing device 400 is shown, in accordance with an embodiment of the present invention. The computing device 400 is configured to perform fiber type identification and localization.

The computing device 400 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 400 may be embodied as one or more compute sleds, memory sleds, or other racks, sleds, computing chassis, or other components of a physically disaggregated computing device.

As shown in FIG. 4, the computing device 400 illustratively includes the processor 410, an input/output subsystem 420, a memory 430, a data storage device 440, and a communication subsystem 450, and/or other components and devices commonly found in a server or similar computing device. The computing device 400 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 430, or portions thereof, may be incorporated in the processor 410 in some embodiments.

The processor 410 may be embodied as any type of processor capable of performing the functions described herein. The processor 410 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 430 may be embodied as any type of volatile or non-volatile memory or data storage capable of performing the functions described herein. In operation, the memory 430 may store various data and software used during operation of the computing device 400, such as operating systems, applications, programs, libraries, and drivers. The memory 430 is communicatively coupled to the processor 410 via the I/O subsystem 420, which may be embodied as circuitry and/or components to facilitate input/output operations with the processor 410, the memory 430, and other components of the computing device 400. For example, the I/O subsystem 420 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 420 may form a portion of a system-on-a-chip (SOC) and be incorporated, along with the processor 410, the memory 430, and other components of the computing device 400, on a single integrated circuit chip.

The data storage device 440 may be embodied as any type of device or devices configured for short-term or long-term storage of data such as, for example, memory devices and circuits, memory cards, hard disk drives, solid state drives, or other data storage devices. The data storage device 440 can store program code 440A for multi-modality integration, 440B for root cause analysis, and/or 440C for anomaly correction. Any or all of these program code blocks may be included in a given computing system. The communication subsystem 450 of the computing device 400 may be embodied as any network interface controller or other communication circuit, device, or collection thereof, capable of enabling communications between the computing device 400 and other remote devices over a network. The communication subsystem 450 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 400 may also include one or more peripheral devices 460. The peripheral devices 460 may include any number of additional input/output devices, interface devices, and/or other peripheral devices. For example, in some embodiments, the peripheral devices 460 may include a display, touch screen, graphics circuitry, keyboard, mouse, speaker system, microphone, network interface, and/or other input/output devices, interface devices, and/or peripheral devices.

Of course, the computing device 400 may also include other elements (not shown), as readily contemplated by one of skill in the art, as well as omit certain elements. For example, various other sensors, input devices, and/or output devices can be included in computing device 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 400 are readily contemplated by one of ordinary skill in the art given the teachings of the present invention provided herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for root cause analysis, comprising:

combining system logs and system metrics from a cyber-physical system into time-series data;

performing individual root cause analysis to determine individual causal scores for respective system entities that are related to system anomalies of the cyber-physical system based on the time-series data;

performing topological root cause analysis that utilizes disentangled causal graph learning with a graph neural network (GNN) based vector autoregressive framework to capture topological patterns of the system anomalies within the cyber-physical system in real-time through learned causal graphs based on the time-series data;

integrating the individual causal scores and topological scores resulting from the topological root cause analysis by a weighted sum to identify system entities as root causes for the system anomalies based on a likelihood of nodes of the learned causal graphs being root causes; and performing a corrective action on an entity from the system entities identified as the root causes of the system anomalies for the cyber-physical system based on the weighted sum, the corrective action including halting a compromised process based on the root causes identified as an intrusion in the network system of the cyber-physical system.

2. The method of claim 1, further comprising performing early root cause localization to determine the entity after a tolerance time has elapsed.

3. The method of claim 1, wherein combining system logs and system metrics includes parsing the system logs to convert the system logs into respective time series.

4. The method of claim 1, further comprising performing trigger point detection to detect the system anomalies based on a distance measured between two consecutive batches of time-series data.

5. The method of claim 4, wherein the distance is measured according to a log-Euclidean distance or a log-Cholesky distance.

6. The method of claim 4, wherein performing trigger point detection includes generating respective covariance matrices for the two consecutive batches of time-series data and determining the distance between the covariance matrices.

7. The method of claim 1, wherein performing individual root cause analysis uses an extreme value theory approach.

8. The method of claim 1, wherein performing topological root cause analysis uses disentangled causal graph learning that separates invariant and variant causal relationships among various system entities of the cyber-physical system through learned causal graphs generated based on the time-series data.

9. The method of claim 1, wherein the entity is an entity within a cloud computing environment.

10. The method of claim 1, wherein the corrective action includes changing a configuration, environmental condition, or operational status of the entity.

11. A system for root cause analysis, comprising:

a hardware processor; and a memory that stores a computer program which, when executed by the hardware processor, causes the hardware processor to:

combine system logs and system metrics from a cyber-physical system into time-series data;

perform individual root cause analysis to determine individual causal scores for respective system entities that are related to system anomalies of the cyber-physical system based on the time-series data;

perform topological root cause analysis that utilizes disentangled causal graph learning with a graph neural network (GNN) based vector autoregressive framework to capture topological patterns of the system anomalies within the cyber-physical system in real-time through learned causal graphs based on the time-series data;

integrate the individual causal scores and the topological scores resulting from the topological root cause analysis by a weighted sum to identify system entities as root causes for the system anomalies based on a likelihood of nodes of the learned causal graphs being root causes; and perform a corrective action on an entity from the system entities identified as the root causes of the system anomalies for the cyber-physical system based on the weighted sum, the corrective action including halting a compromised process based on the root causes identified as an intrusion in the network system of the cyber-physical system.

12. The system of claim 11, wherein the computer program further causes the hardware processor to perform early root cause localization to determine the entity after a tolerance time has elapsed.

13. The system of claim 11, wherein the combination of system logs and system metrics includes a parsing of the system logs to convert the system logs into respective time series.

14. The system of claim 11, wherein the computer program further causes the hardware processor to perform trigger point detection to detect the system anomalies based on a distance measured between two consecutive batches of time series data.

15. The system of claim 14, wherein the distance is measured according to a log-Euclidean distance or a log-Cholesky distance.

16. The system of claim 14, wherein the performance of trigger point detection includes generation of respective covariance matrices for the two consecutive batches of time-series data and determining the distance between the covariance matrices.

17. The system of claim 11, wherein the performance of individual root cause analysis uses an extreme value theory approach.

18. The system of claim 11, wherein the performance of topological root cause analysis uses disentangled causal graph learning that separates invariant and variant causal relationships among various system entities of the cyber-physical system through learned causal graphs generated based on the time-series data.

19. The system of claim 11, wherein the entity is an entity within a cloud computing environment.

20. The system of claim 11, wherein the corrective action includes a change of configuration, environmental condition, or operational status of the entity.

* * * * *